July 7, 1953　　　　　J. T. CASTLE　　　　2,644,348
INSTRUMENT FOR BORING ALIGNED HOLES
Filed Dec. 7, 1948　　　　　　　　　　　2 Sheets-Sheet 2
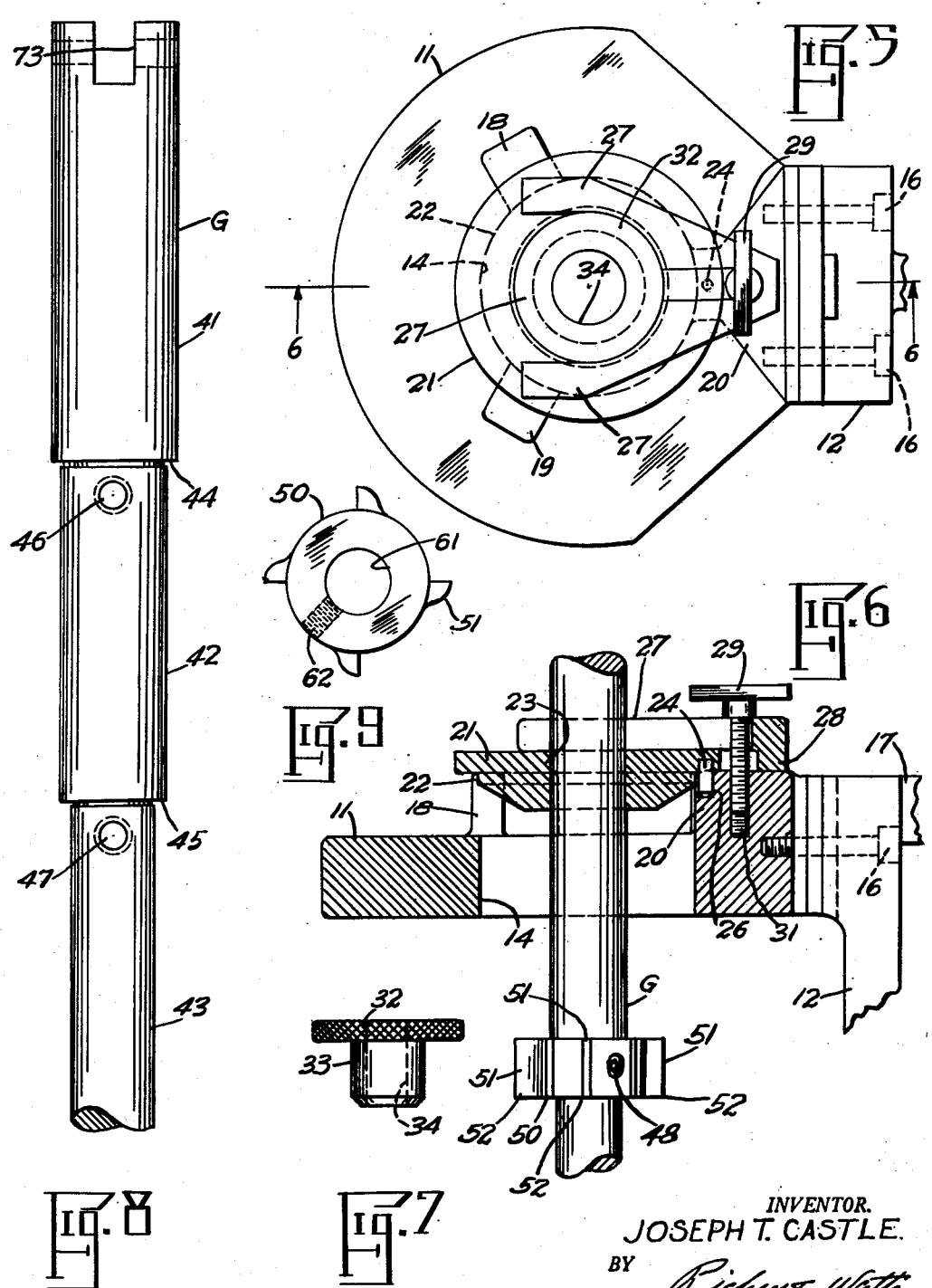
INVENTOR.
JOSEPH T. CASTLE.
BY
Richey & Watts
ATTORNEYS.

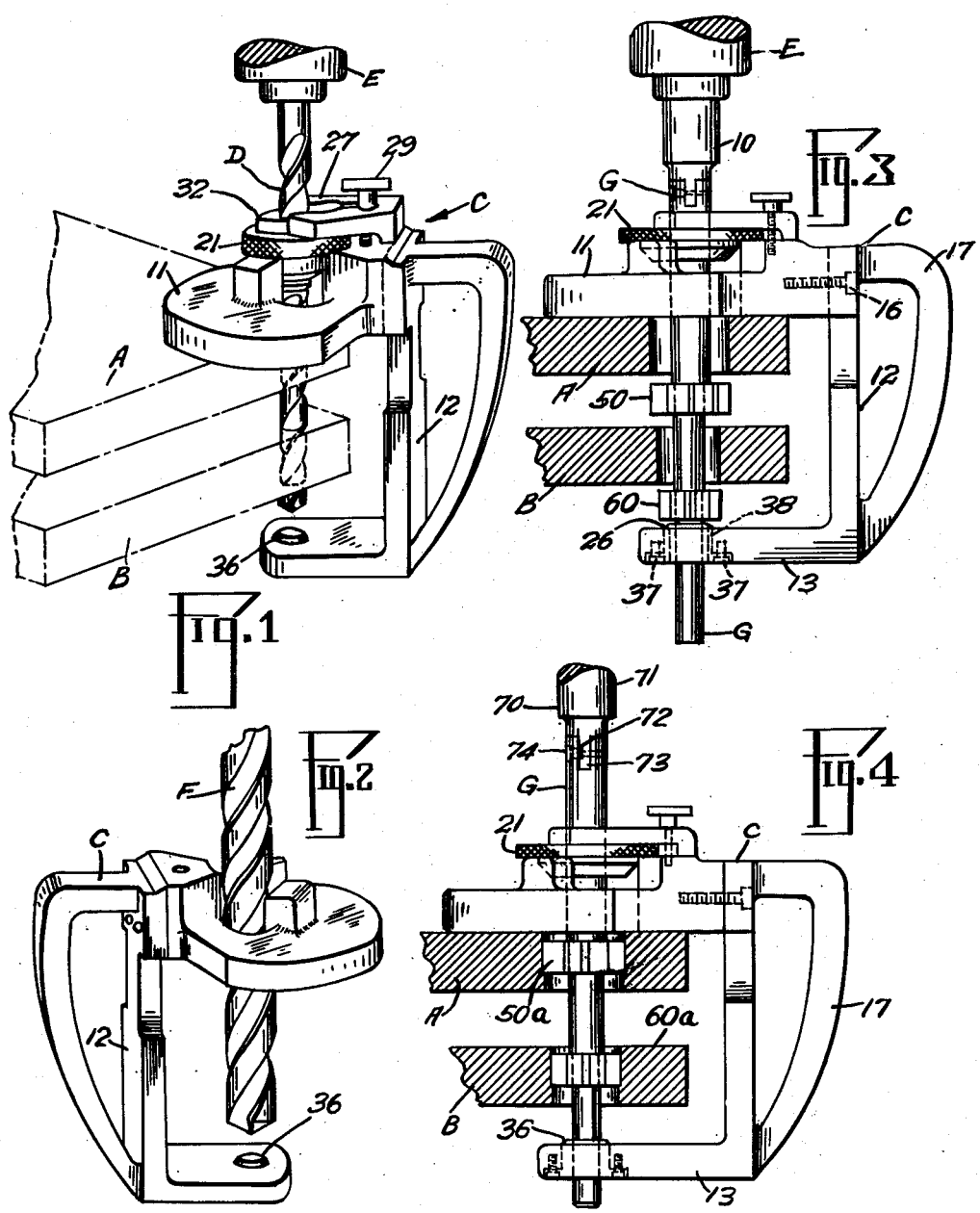

Patented July 7, 1953

2,644,348

UNITED STATES PATENT OFFICE 2,644,348

INSTRUMENT FOR BORING ALIGNED HOLES

Joseph Thomas Castle, Cleveland, Ohio

Application December 7, 1948, Serial No. 63,912

1 Claim. (Cl. 77—2)

This invention relates to the art of working metal. The invention was conceived as a solution to the problem of boring accurately aligned holes in the head and base plates of a pillar-type die set such as are used in punch presses and the like, and the preferred embodiment of the invention, described herein, is directed to this problem.

It will be apparent to those skilled in the art, however, that the invention is capable of application to many problems of accurate boring and is not limited to the situation in which its use is exemplified in this specification.

The specific embodiment of the invention disclosed herein constitutes a method and apparatus for boring accurately dimensioned and accurately aligned holes in two heavy iron or steel plates which are to form the head and base plates of a die set. In the further fabrication of these die sets, bushings are customarily pressed into the holes in one plate and pins are fitted in the holes in the other plate. The bushings slide on the pins to guide the two parts of the die accurately in the relative reciprocation. However, the same problem exists whether or not bushings are employed.

Experience has shown that with known machine shop techniques, excessive time is required for boring the holes in the plates, and that even with the exercise of a high degree of skill and care there is often sufficient misalignment of one or another hole so that the die set parts do not slide freely.

By virtue of the method and apparatus of the invention, however, holes aligned to a high degree of accuracy can be produced in ordinarily less than one-third of the time required by previous techniques, and by relatively unskilled mechanics. Moreover, accurate work does not require precision machine tools. The invention may be practiced with an ordinary drill press.

The principal object of the invention is to facilitate the boring of holes in accurate alignment. Another object of the invention is to provide an improved method for boring the parts of pillar-type dies to accommodate the pins. A further object of the invention is to provide improved die sets of the pillar type. A further object of the invention is to provide an apparatus especially suited to simplify and expedite the boring of aligned holes and which is inherently adapted to produce work of high quality without requiring the exercise of craftsmanship. A still further object is to accomplish precision boring with imprecise tools, such as drill presses.

The manner in which these objects are accomplished, and certain ancillary objects of the invention are realized, will be apparent to those skilled in the art from the description herein of the preferred method and apparatus.

Referring to the drawings:

Fig. 1 is an axonometric view of the apparatus of the invention illustrating the step of drilling a pilot hole;

Fig. 2 is a similar view illustrating the drilling of an enlarged or rough hole;

Fig. 3 is an elevation, partly in section, illustrating the conclusion of the rough boring operation;

Fig. 4 is a similar view illustrating the final or finish boring operation;

Fig. 5 is a plan view of the apparatus;

Fig. 6 is a partial elevation view, principally in section, on the plane indicated in Fig. 5;

Fig. 7 is a side view of a drill bushing;

Fig. 8 is a side view of a boring bar; and

Fig. 9 is an axial view of a boring cutter.

The method of the invention may be outlined briefly as follows: The blanks A and B which are being fabricated into the head plate and base plate respectively of the die set are mounted one above the other in parallel relation by means of parallel blocks or the like on the bed of a drill press, and are held down by any convenient means not shown. The blanks are disposed to project beyond the bed so that the bed does not interfere with the positioning of the lower arm of the boring device of the invention. The blanks may be clamped to the bed proper and, where a device such as a radial drill press is used, the tools may be swung so as to bring the work under the head, while for fixed head presses, the work may be positioned by adjustment of the bed. The desired locations for the holes for the pillars and bushings are laid out and center punched on the plate A. The frame C of the boring device is clamped in place immediately over one of the center punch marks. It is then fitted with a drill bushing and both plates are drilled through by a relatively small pilot drill D in the spindle E of the drill press, as illustrated in Fig. 1. Following this, the apparatus is partially dismantled to provide clearance for a larger drill F (Fig. 2) which also drills through both plates.

In the third machining step of the invention, a boring bar G (Fig. 3) is mounted in the frame C and is operated by the rotation and feed of the spindle E of the drill press to bore aligned holes in the plates A and B, this constituting the rough boring operation.

The machining is completed by repeating the boring operation, as illustrated in Fig. 4, with finish size cutters which may be on bar G or on a second bar, if desired. The apparatus is so constructed as to maintain the alignment and position of the boring device at all times.

The preferred method will be further explained after a description of the preferred form of apparatus of the invention. The apparatus is illustrated as a whole in Figs. 1, 3, and 4, and Figs. 5 to 9 illustrate details of the construction. As will be apparent from the drawings, the frame C is generally C-shaped and comprises an upper arm 11, an upright portion 12, and a lower arm 13; the upper arm is in the form of an approximately annular plate through which is formed a hole 14 (Fig. 6). The plate 11 is preferably a casting separate from the upright portion 12 and lower arm 13, which also are preferably cast. It will be apparent, however, that the parts may be fabricated by machining or welding rather than by casting. The plate 11 is machined and fitted to the upright member 12 and the two are held in assembled relation by cap screws 16. It will be apparent that these may be unitary, if desired, the utilization of separate pieces being principally to facilitate the casting. The undersurface of the plate 11 is machined accurately plane to provide a reference surface by which the bored holes are aligned. Preferably, a handle 17, which may be of the general form shown, is formed integral with the upright member 12, serving both to facilitate handling of the device and as a stiffener.

Three bosses 18, 19, and 20 rise from the upper surface of the plate 11, spaced approximately equi-angularly about the center of the opening 14. The inner faces of these bosses are bored and the top surfaces are faced to provide an accurate fit for a bearing bushing 21 which comprises a flange adapted to rest on the upper surfaces of the bosses, and a cylindrical portion 22 turned to fit accurately within the bored inner faces of the bosses. The bearing bushing 21 is formed with a central bore 23 dimensioned to provide a radial bearing for the boring bar G, as illustrated in Fig. 6. The bore 23 is perpendicular to the undersurface of the plate 11. The bushing may be fitted with a pressed pin 24 which fits loosely in any opening 26 in the plate 11 to prevent rotation of the bushing. The bushing 21 may be held down by a forked clamp 27 adapted to rest on the bushing, provided with a foot 28 and clamped by a thumb screw 29 received in a tapped hole 31 of the plate.

A pilot drill bushing 32 illustrated in Fig. 7 and shown in place in Figs. 1 and 5 consists of a flanged bushing, with a cylindrical portion 33 of an outside diameter adapted to fit the bore 23 of the bushing 21 and with an internal bore 34 of suitable dimension to guide a pilot drill, such as D in Fig. 1. The bushing 32 is, of course, hardened to prevent wear by the drill. The lower arm 13 of the frame is bored and fitted with a bearing bushing 36 which may be held in place by screws 37. The seat for this lower bushing is machined in alignment with the seat for the upper bearing bushing 21. The bushing 36 provides a bearing for the lower end of the boring bar G, as illustrated in Figs. 3 and 4, the bushings 21 and 36 maintaining the bar perpendicular to the reference surface.

The boring bar, as shown most clearly in Fig. 8, is preferably formed with an upper section 41, an intermediate section 42, and a lower section 43, of progressively decreasing diameter, defining shoulders 44 and 45 to determine the axial location of cutters of the preferred type and receive the axial thrust thereof. Tapped holes 46 and 47 are provided to receive set screws 48 (Fig. 6) which retain the cutters in place.

While the form of the cutters may vary, in the practice of the invention it has been found to be most successful with a cutter generally similar in its action to an end mill, such as the cutter 50 (illustrated most clearly in Figs. 6 and 9) formed with flutes 51, preferably four in number, the lower edges of which are the cutting edges, as at 52. The cutters for the operation described herein are provided in pairs, the upper cutter 50 (Fig. 3) ordinarily being larger in diameter than the lower cutter 60, the cutters being otherwise similar except that the diameter of the internal bore 61 of the cutters of the upper set is such as to fit over the portion 42 of the boring bar whereas the internal diameter of the cutter 60 is such as to fit the portion 43 of the boring bar. A hole 62 for the retaining screw is formed in each cutter.

The most significant fact about the cutting tools is that they are symmetrical, by which term is meant that equally loaded cutting edges are distributed around the periphery of the cutters so that there is no unbalanced load tending to cause deflection of the boring bar, as with fly cutters. The outer diameter of the cutting flutes 51 tapers very slightly toward the top of the cutters.

The bearing bushings 21 and 36 are dimensioned for close fit and guidance on the portions 41 and 43 of the boring bar respectively. The boring bar may be coupled to the spindle E of the drill press or other machine tool by a coupling device 70 (Figs. 3 and 4) comprising a standard taper shank 71 and a transverse rib 72 dimensioned to fit loosely within a transverse slot 73 in the top of the bearing bar. A pin or bolt 74 passing through aligned holes in the tool members ordinarily retains the coupling device 70 removably on the boring bar G. Preferably, the fit between these devices, including the fit between the coupling device and the pin 74, is sufficiently loose to accommodate a reasonable amount of misalignment of the spindle E of the drill with the boring bar G. Of course, if desired, other known flexible couplings may be employed in place of that described herein.

Now that the apparatus by which the method is practiced has been described, the foundation has been provided for a full explanation of the method. The size of holes which are desired in the two plates A and B will be known; and cutters, both of the exact finished size of the hole, and rough cutters, which may be any convenient amount smaller than the finishing cutters, will be selected. A roughing drill F, slightly smaller than the smaller of the two roughing cutters, and a pilot drill D dimensioned to fit within the drill bushing 32 are needed. The plates A and B are set up in parallel relation on the drill press table which may be quite simply accomplished with parallel blocks, assuming the plates to be flat. If they are not, the plates are set up in any suitable manner. The centers of the holes are punched on the plate A and the pilot drill D is inserted in the socket E. With the bearing bushing 21 and drill bushing 32 in place in the apparatus, as illustrated in Fig. 1, the fixture is moved into position over the first one of the center punch marks with which it may be aligned approximately by setting the drill in the punch mark, then using the drill to set the device. The plate 11 may rest directly on the plate A, or on parallel blocks (not shown) if desired. The device is then clamped in position, which may be conveniently accomplished by C-clamps bearing under the plate A and on top of the plate 11, which clamps are omitted from the drawings in order to show the significant parts of the apparatus with greater clarity.

The pilot drill D is then run through both plates in the usual manner, guided by the bushing 32 (Fig. 1).

The pilot drill D is then removed and replaced by the large drill F and the clamp 27, bushing 32, and bushing 21 are removed by loosening the thumb screw 29 to provide clearance for the large drill. Both plates may then be drilled with the large drill, which, in this case, should be slightly smaller than the smaller of the two roughing cutters. However, if desired, after the lower hole has been roughed with the drill F, a slightly larger drill may be run through the hole in the plate A to increase it to a size approaching the roughing cutter and the plate A. Where such operations are of sufficient frequency, it is also possible and very convenient to use a stepped drill having an upper portion of larger diameter than the bottom portion so that the holes in both plates may be drilled most appropriately for a roughing cut in a single operation.

In general, it is preferable to use two drills or a stepped drill, since this reduces the amount of boring necessary in the upper plate and saves time by making it unnecessary to cut through the upper plate with the lower roughing cutter 60.

In any event, when the rough drilling is completed, the boring bar G with the roughing cutters 50 and 60, which may be conveniently something like $\tfrac{1}{16}$ inch smaller than the finished size of the respective holes, is inserted into the lower bearing bushing 36 and the upper bushing 21 is replaced and clamped. The coupling device 70 is then coupled to the boring bar and seated in the socket E of the spindle. With the boring bar thus guided by the bushings 21 and 36, the hole in the upper plate is roughed with the cutter 50, and substantially simultaneously the hole in the lower cutter B is roughed with the cutter 60. As much as a quarter inch of metal may be removed without difficulty. The initial set-up is preferably such that the spacing of the plates approximately equals the spacing of the cutters, in order to save time. Obviously, the space between the plates A and B and the spacing between the plate B and arm 13 must be greater than the width of the cutters. This relation is illustrated in Fig. 3, showing the completion of the roughing operation.

When the roughing cut is completed, the boring bar is withdrawn and either the bar is replaced by a similar bar with the finishing cutters in place or the roughing cutters are removed from the bar G by loosening and removing the set screws 48 and the finish cutters 50a and 60a are put on the bar in place of the roughing cutters. The finishing operation is illustrated in Fig. 4, which shows the cutters slightly more than halfway through the plates.

It will be apparent that the sequence of operations outlined above requires no significant amount of skill and no precise operations. It will also be apparent that the operation may be completed in a very short time. The cutters, having four edges and being balanced with respect to the reaction of the work, are much faster than fly cutters. In the finishing operation, however, it is preferable to use a very slow feed for the cutters so as to obtain a very smooth cut. No reaming of the holes produced by this method is needed. The perfection of the surface which eliminates reaming, also thus eliminates inaccuracies which are often introduced in reaming.

This precise work does not depend upon accuracy of the machine tool. An ordinary drill press may be employed.

The procedure described above is that ordinarily employed for boring pillar-type die bases and heads. In most cases no great degree of precision as to the exact location of the holes in the plate is required, it only being necessary that the holes in the two plates be accurately aligned with each other and accurately perpendicular to the direction of travel of the dies. If desired, however, the apparatus may be set up with great precision as to location of the holes as by calipering from some reference point to the bar and then shifting the frame accordingly. A very considerable degree of accuracy may be obtained if the hole 14 is bored parallel and aligned with the mounting for the bushing 21 by simply using calipers to align the walls of the hole 14 with a center punch mark, button, or other reference indicating the desired location of the hole.

While the plate 11 is shown in the drawings as resting on the surface of the plate A, it may be spaced therefrom by parallel blocks, if desired. Obviously, also, the device may be canted by appropriate means to bore holes inclined to the surface of the plate A.

It will be apparent from the above disclosure of the method for finishing holes of different sizes in two plates, that holes of the same size may be finished with a single cutter and that the apparatus is obviously adapted to the boring of a hole through a single plate or block. The apparatus illustrated is adaptable, merely by the provision of cutters of desired sizes, to a great variety of work. Although they are less convenient, cutters larger than the opening 14 may be employed where the plate 11 is spaced from the work piece, the cutter is held between the two arms of the frame and the bar is fitted through the cutter.

A plane reference surface on the plate 11 perpendicular to the axis of the boring bar is the most generally useful. Special surfaces to align the boring bar in a desired manner with particular work pieces could obviously be substituted if such were desired.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

A device for boring aligned holes in a pair of plates comprising a C-shaped frame having upper and lower arms integral with a body portion, the upper arm being in the form of a generally annular plate normal to the plane of the C and provided with a reference surface on the inner face thereof, a seat for a bearing bushing formed on the upper side of the upper arm, said arm being perforate beneath said seat, a bearing bushing insertable in the seat and positively located axially thereby, a bearing in the lower arm, the bearing and the bearing bushing being relatively fixed by the frame in constant alignment and defining an axis of rotation oriented with respect to the reference surface, a boring bar dimensioned for rotation and reciprocation in the bearing and bearing bushing and two symmetrical boring cutters on the bar, the boring cutters being smaller than the opening in the arm, all so constructed and arranged that the boring bar and cutters may be inserted from above through the opening in the upper arm and the bearing bushing may be replaced over the bar and seated in the upper arm.

JOSEPH THOMAS CASTLE.

References Cited in the file of this patent

UNITED STATES PATENTS

| Number | Name | Date |
| --- | --- | --- |
| 1,323,267 | Hanson | Dec. 2, 1919 |
| 1,343,517 | Champion et al. | June 15, 1920 |
| 1,401,262 | Kranz | Dec. 27, 1921 |
| 1,952,342 | Vedoe | Mar. 27, 1934 |
| 2,020,439 | Sorensen | Nov. 12, 1935 |
| 2,167,673 | Oberhoffken | Aug. 1, 1939 |
| 2,351,243 | Vetter | June 13, 1944 |
| 2,451,683 | Wantle | Oct. 19, 1948 |

FOREIGN PATENTS

| Number | Country | Date |
| --- | --- | --- |
| 499,101 | Germany | June 5, 1930 |